US011192043B2

(12) United States Patent
Sambati

(10) Patent No.: US 11,192,043 B2
(45) Date of Patent: Dec. 7, 2021

(54) MOLD DEVICE FOR KIDS

(71) Applicant: MEMENTO S.R.L., Lecce (IT)

(72) Inventor: Andrea Luigi Sambati, Lecce (IT)

(73) Assignee: MEMENTO S.R.L, Lecce (IT)

( * ) Notice: Subject to any disclaimer, the term of this patent is extended or adjusted under 35 U.S.C. 154(b) by 256 days.

(21) Appl. No.: 16/338,612

(22) PCT Filed: Oct. 6, 2017

(86) PCT No.: PCT/IB2017/056180
§ 371 (c)(1),
(2) Date: Apr. 1, 2019

(87) PCT Pub. No.: WO2018/065951
PCT Pub. Date: Apr. 12, 2018

(65) Prior Publication Data
US 2020/0038770 A1    Feb. 6, 2020

(30) Foreign Application Priority Data
Oct. 7, 2016 (IT) .......................... 102016000100775

(51) Int. Cl.
*A63H 33/00* (2006.01)
*B29C 39/00* (2006.01)
(Continued)

(52) U.S. Cl.
CPC ......... *A63H 33/001* (2013.01); *B29C 39/003* (2013.01); *B29C 39/02* (2013.01);
(Continued)

(58) Field of Classification Search
CPC .... A63H 33/001; B29C 39/003; B29C 39/02; B29C 39/26; B29C 39/42; B29C 33/10;
(Continued)

(56) References Cited

U.S. PATENT DOCUMENTS 3,685,942 A * 8/1972 Shaffer ..................... B44C 5/00
425/276
5,766,653 A    6/1998 Wiggs et al.
(Continued)

FOREIGN PATENT DOCUMENTS

CN    201533996 U    7/2010
DE    2549756 A1    5/1977

*Primary Examiner* — Michael M. Robinson
*Assistant Examiner* — Victoria Bartlett
(74) *Attorney, Agent, or Firm* — Volpe Koenig

(57) ABSTRACT

The present invention relates to a mould (1) for kids for making jewelry from a granular water-sensitive product, comprising: —a hollow body (2) having an opening (3) defining a respective forming zone; —a first element (4) combined with the hollow body (2) for closing-opening the opening (3) at a first side of the forming zone; —a second element (5) combined with the hollow body (2) for closing, and possibly opening, the opening (3) at a second side of the forming zone; wherein at least one among the hollow body (2), the first element (4) and the second element (5) comprises a plurality of holes (6) which are open in the forming zone, such that the forming zone is fluidically communicating with the environment outside of the mould (1).

14 Claims, 10 Drawing Sheets

(51) Int. Cl.
*B29C 39/02* (2006.01)
*B29C 39/26* (2006.01)
*B29C 39/42* (2006.01)
*B29K 27/06* (2006.01)
*B29K 29/00* (2006.01)
*B29K 105/00* (2006.01)
*B29L 31/52* (2006.01)
*B29L 31/00* (2006.01)

(52) U.S. Cl.
CPC .............. *B29C 39/26* (2013.01); *B29C 39/42* (2013.01); *B29K 2027/06* (2013.01); *B29K 2029/04* (2013.01); *B29K 2105/251* (2013.01); *B29L 2031/52* (2013.01); *B29L 2031/743* (2013.01)

(58) Field of Classification Search
CPC ............ B29K 2027/06; B29K 2029/04; B29K 2105/251; B29L 2031/52; B29L 2031/743
See application file for complete search history.

(56) References Cited

U.S. PATENT DOCUMENTS

| | | | |
|---|---|---|---|
| 5,954,561 A | 9/1999 | Cannone | |
| 6,176,464 B1* | 1/2001 | Harvey | A63H 33/001 |
| | | | 249/126 |
| 6,767,938 B1* | 7/2004 | Cordova | C08L 5/04 |
| | | | 524/28 |
| 2008/0241312 A1 | 10/2008 | Hamilton | |
| 2009/0072436 A1* | 3/2009 | Dean | B29C 43/52 |
| | | | 264/219 |
| 2015/0151211 A1* | 6/2015 | Drylie | A63H 33/001 |
| | | | 446/85 |
| 2017/0050118 A1* | 2/2017 | LaDuke | A63H 33/001 |

* cited by examiner

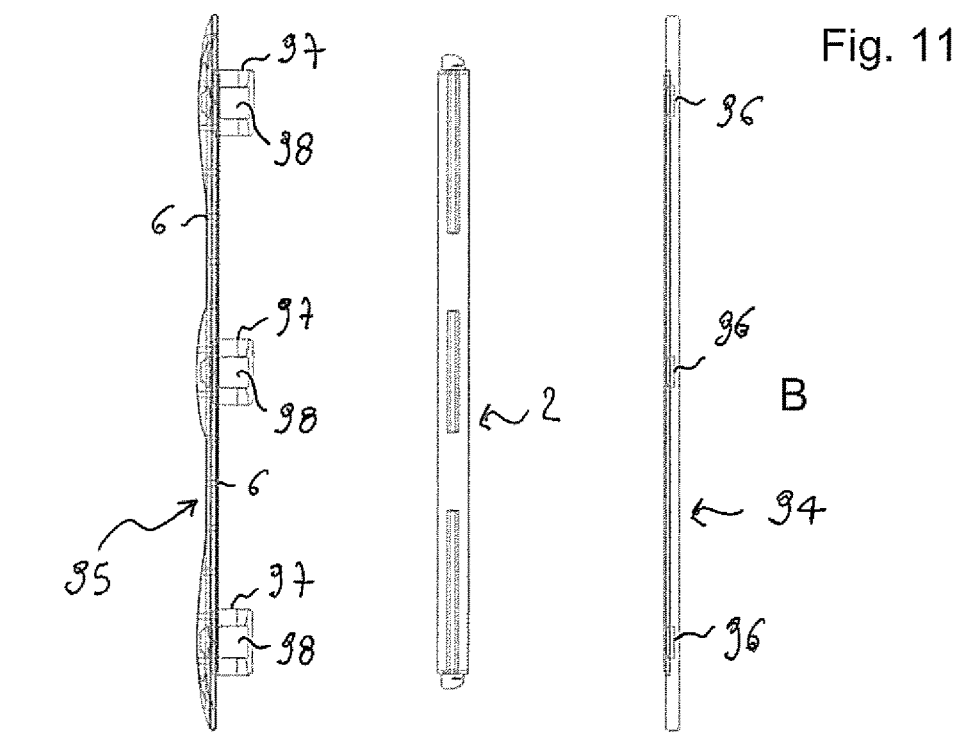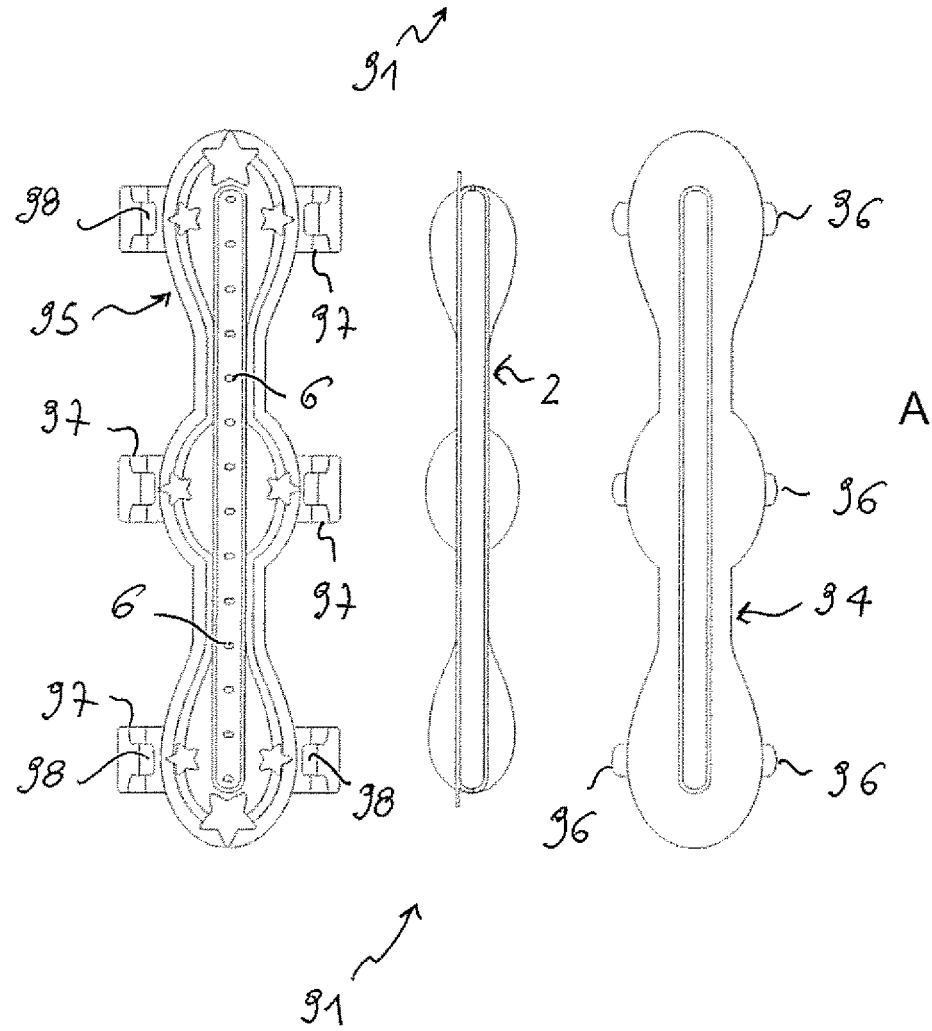
Fig. 11

MOLD DEVICE FOR KIDS

FIELD OF THE INVENTION

In its more general aspect the present invention relates to the technical field of toys and, in particular, it relates to a mould for kids.

STATE OF THE ART

As it is known, the toy field provides huge variety of products for every age group.

Those requiring active kid participation are among the most appreciated toys, not only by the kids themselves but also by the parents.

Toys with which the kids become protagonists by creating, by playing with such toys, further toys or anyway something new, have been thus established themselves over the years.

For instance, think to the popular Meccano or kits for making various kinds of decorations.

Water-sensitive product has already got widespread in the marketplace for some time, in powder or solid gel granule form that kids use to make colored balls.

Essentially it is a polyvinyl alcohol-, sodium tetraborate- and polyvinyl chloride-based mixture, which can be available in a range of colors, that in contact with water, subjected to slight pressure and then drained from water, turns in a solid, compact and rubbery material.

A kid can thus achieve not only a rubber ball but can also achieve a rubber ball colored, customized and different from all the other rubber balls.

In order to be suitable for kids, the making of rubber balls of the afore mentioned type is very simple; in practice, a plastic spherical mould is used, comprising two hemispherical half-shells and having holes for the passage of water which are dimensioned so that to hinder the product from coming out when still dry and in powder form.

Although advantageous, such a solution of the afore mentioned type is not free from drawbacks, for instance only balls or anyway spherical objects can be made.

In addition, there is the difficulty of filling the open mould with a suitable mixture amount.

Again, there is the risk of wasting some product in the operation of filling or coupling the half-shells, dropping it outside the half-shells themselves.

Furthermore, the operation of extracting the ball from a half-shell, once the mould is open, is carried out by grasping the ball by hand, which can cause the permanent deformation of the ball if it is still excessively wet or humid, thus not enough dried.

Ultimately, the know art doesn't provide toys that allow the user making non-spherical objects, simply and safely, as well as with a high level of customization.

SUMMARY OF THE INVENTION

The technical problem underlying the present invention has been to provide a mould for kids having structural and/or functional characteristics such to overcome one or more of the afore mentioned drawbacks referring to the known art, and in particular a mould of the afore said type, thus for domestic or anyway leisure use, which is intended to be used with a water-sensitive product, for example a powder or granule gel, for the making of wristbands, bracelets, necklaces, small necklaces, clips, pins, rings and like jewelry or decorative objects, which is particularly simple to be made, particularly simple to be used, as well as cheap and effective in the operations of loading the mould, forming the decorative object to be obtained and extracting the same from the mould.

According to the invention, the afore said problem is solved by a mould for kids comprising:

- a hollow body having at least one opening defining at least one respective forming zone;
- a first element combined with the afore said hollow body for closing-opening the afore said at least one opening at a first side of the afore said at least one forming zone;
- a second element combined with the afore said hollow body for closing, and possibly opening, the afore said at least one opening at a second side of the afore said at least one forming zone;
- wherein at least one among the afore said hollow body, the afore said first element and the afore said second element comprises a plurality of holes having a limited predefined width, which are open in the afore said at least one forming zone, such that the afore said at least one forming zone is fluidically communicating with the environment outside of the afore said mould.

By the afore said expression "plurality of holes" any opening, for instance also slits, slots or passages, able to implement the afore said fluid communication is meant.

In practice, according to the invention, the afore said at least one forming zone is a portion of the mould and in particular of the afore said hollow body, which is intended to the forming of the afore said water-sensitive product in order to obtain the desired decorative object or jewelry of the afore considered type.

Again, according to the invention, the afore said first element and the afore said second element can be considered a bottom and a lid respectively for the afore said hollow body and in particular for the afore said opening, which can be a through opening or a blind opening according to the invention, depending upon the removable or not removable combination of at least one between the first element and the second element with the hollow body of the present mould, to which generally reference is made in the following description as an opening.

Preferably, once the mould is assembled, at least one between the afore said first element and the afore said second element comprises at least one respective head portion to close the afore said at least one opening, wherein the afore said at least one head portion remains at least partially inside the afore said at least one forming zone.

Preferably, the afore said mould comprises extracting means adapted to cooperate with the afore said at least one forming zone, wherein the afore said extracting means preferably comprise at least one extracting element having at least one portion whose section is essentially corresponding to the section of the afore said at least one opening.

Preferably, the afore said at least one extracting element is constrained to the afore said first element or the afore said second element, and more preferably the afore said extracting means are made in one piece with, therefore they are integral to, the first element, the second element or the hollow body.

Preferably, the afore said hollow body comprises a side wall surrounding the afore said at least one opening and having two opposing edges.

Preferably, the afore said mould comprises at least two opposing recesses (first recesses), wherein the afore said two opposing recesses have respective ends opening in opposing positions on the same edge between the afore said two opposing edges, or else alternatively wherein the afore said two opposing recesses have respective ends opening in positions corresponding on each of the afore said two opposing edges, i.e. one recess per edge.

According to some embodiments of the invention, the afore said hollow body is constrained to the afore said first element and/or the afore said second element so that to be movable with respect to the afore said first element and/or the afore said second element, wherein preferably the afore said hollow body comprises at least one first portion and one second portion which are paired to delimit the afore said at least one forming zone and which are constrained one another so that to be movable one another, the afore said mould comprising combining means adapted to allow the relative movement between the afore said hollow body and the afore said first element and/or the afore said second element, and possibly between the afore said first portion and the afore said second portion, wherein the afore said combining means are selected from the group comprising interlocked combining means, elastic combining means, snap-fit combining means, magnetic combining means, combining means consisting of weak portions, hinges, hooks.

According to other embodiments of the invention, the afore said hollow body comprises at least one first portion and one second portion which are paired to delimit the afore said at least one forming zone, wherein:
the afore said at least one first portion and one second portion are removably combined one another; or
wherein the afore said at least one first portion and one second portion are constrained one another so that to be movable one with respect to the other when the afore said mould is unassembled; or
wherein the afore said at least one first portion and one second portion are preferably removably combined with the afore said first element and/or the afore said second element, and abut one another, once the mould is assembled, to delimit the afore said at least one forming zone.

Preferably, the afore said mould comprises combining means for preferably removably coupling the afore said first portion with the afore said second portion, and/or the afore said first portion and the afore said second portion with the afore said first element and/or the afore said second element, wherein the afore said combining means are preferably selected from the group comprising: interlocked combining means, elastic combining means, snap-fit combining means, magnetic combining means, combining means consisting of weak portions, hinges, hooks.

Preferably, the afore said mould comprises two opposing appendages jutting from the afore said hollow body outside of the afore said at least one opening, wherein each of the afore said opposing appendages is provided with a respective recess (second recess).

Preferably, each of the afore said recesses of the afore said appendages (second recesses) has a respective end open in a direction opposite to that of the afore said open ends of the afore said two opposing recesses (first recesses).

Preferably, the afore said mould comprises tightening means to tighten one another the afore said hollow body, the afore said first element and the afore said second element, wherein more preferably the afore said tightening means comprise at least one clasp removably combined to the afore said hollow body, the afore said first element and the afore said second element, and wherein still more preferably at least one among the afore said hollow body, the afore said first element and the afore said second element comprises at least one housing seat engaged by the afore said tightening means.

According to an alternative embodiment of the invention, the afore said tightening means comprise a plurality of jutting elements made in one piece with the afore said first element, and a respective plurality of perforated elements made in one piece with the afore said second element, wherein each of the afore said perforated elements is movable between at least one catch position wherein each respective hole is engaged by a respective jutting element, and at least one release position in which the holes of the afore said perforated elements are disengaged from the jutting elements.

Preferably, in the afore said mould the afore said forming zone is essentially flattened, and/or elongated, and/or linear, otherwise cylindrical.

Preferably, the afore said hollow body further comprises a third portion interposed between the afore said first portion and the afore said second portion to delimit the afore said at least one forming zone, wherein preferably the afore said third portion is removably combined with the afore said first portion and/or the afore said second portion.

According to the invention, the afore said problem is equally solved by a kit comprising at least one mould of the afore said type and at least one among:
a pack of a water-sensitive product in powder or gel granules form, wherein the afore said water-sensitive product is a product suitable for kids;
a pack of strings comprising at least one line which is possibly ring-like closed;
a pack of strips of deformable rigid material comprising at least one strip of the afore said material.

Preferably, the afore said at least one line is made of a material selected from the group comprising: plastic, nylon, elastomer, string, silk, cotton, and more preferably the afore said at least one line is made of waterproof material.

Preferably, the afore said at least one strip is made of a material selected from the group comprising: fabric, decoupage paper, and more preferably the afore said at least one strip is made of waterproof material.

Preferably, the afore said at least one strip has a profile essentially corresponding to the section of the afore said at least one opening of the afore said hollow body.

Therefore, according to the invention a mould for kids is provided to be used with a water sensitive product in powder or anyway dry or gel granular form, being structurally and functionally simple, thus cheap to be made, and not requiring particular manual skills to be used and, therefore, being suitable to be effectively used by a kid also for the making of wristbands, bracelets, necklaces, small necklaces, clips, pins, rings and like decorative objects, preferably of an essentially flattened or cylindrical shape.

Advantageously the present mould, thus the present kit, allows making decorative objects of the afore considered type, customized in color and surface decoration, without the use of hazardous materials and solvents, without the use of dangerous presses and without the need of resorting to high temperatures for forming the desired object.

BRIEF DESCRIPTION OF THE FIGURES

Further characteristics and advantages of the invention will be more evident from the review of the following detailed description of some preferred, but not exclusive, embodiments depicted for illustration purposes only and without limitation, with the aid of the attached drawings, wherein:

FIG. 11, in its portions A and B, shows the mould of FIG. 1 according to a further alternative embodiment of the present invention, with separate parts, according to a top and a side view, respectively.

DETAILED DESCRIPTION OF THE INVENTION

Figure 1:
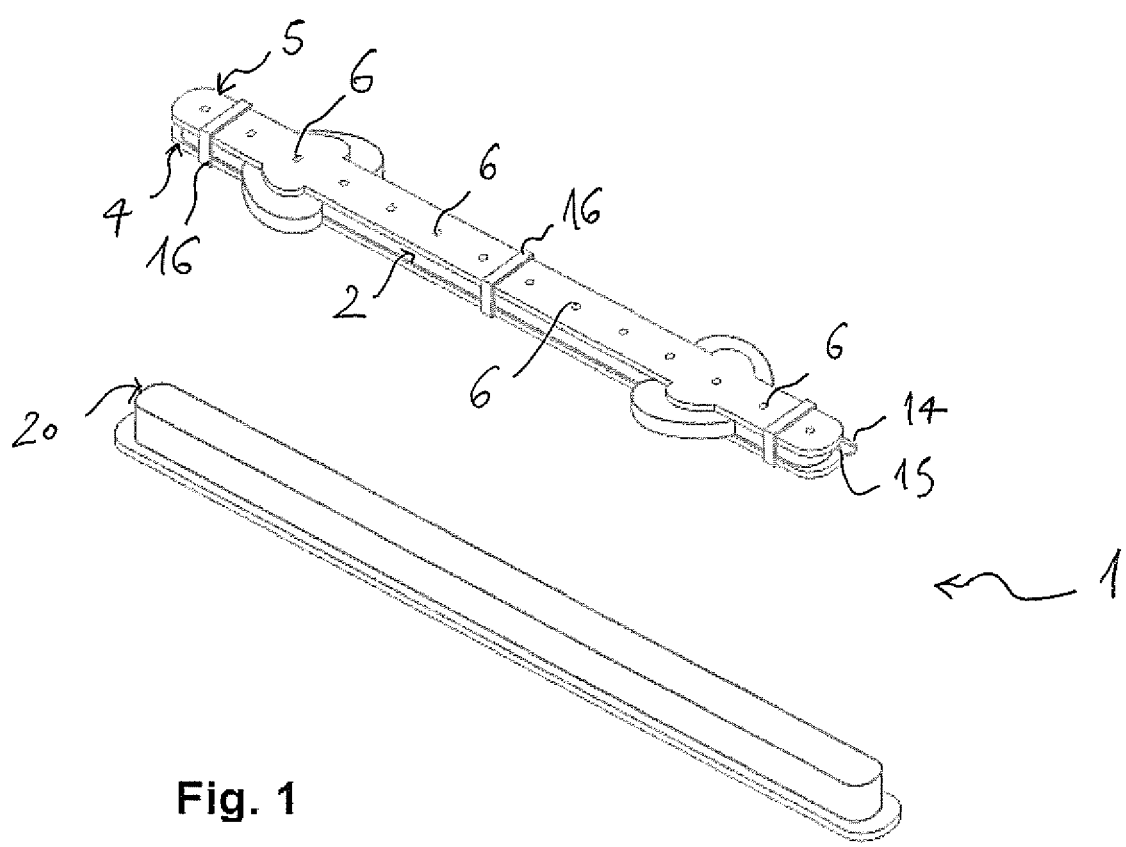
FIG. 1 shows an assembled mould for kids, comprising: a hollow body having an opening defining a respective forming portion, in addition to a first element and a second element removably combined with the afore said hollow body for closing, then for opening, at opposed sides the afore said opening, according to a first embodiment of the present invention.
Figure 2:
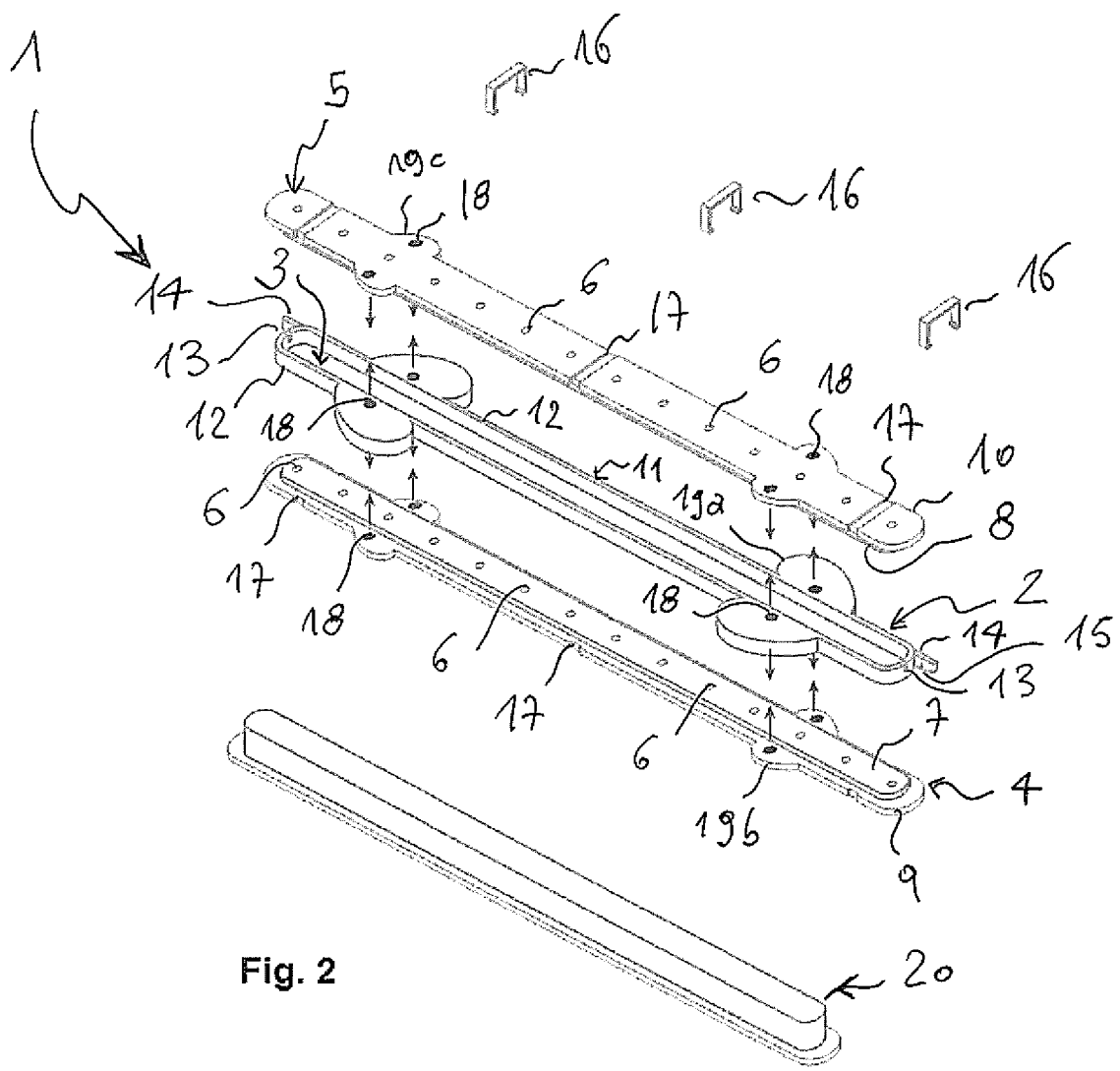
FIG. 2 shows the mould of FIG. 1 with separate parts.

Referring to FIGS. 1 and 2, a mould for kids for making decorative objects of the type, for instance, of wristbands, bracelets, necklaces, small necklaces, clips, pins, rings and like jewelry, is overall denoted with numeral 1.

The mould 1, shown assembled in the example of FIG. 1 and with separate parts in FIG. 2, is intended to be used with a water-sensitive product, in powder or anyway granular form, in gel granules also, that once immersed in water for a predefined time interval and then drained from the water itself, takes a solid, compact and rubbery consistency.

Products of the afore said type, widely popular on the marketplace, generally consist of polyvinyl alcohol-, sodium tetraborate- and polyvinyl chloride-based mixtures.

In detail, the mould 1 comprises a hollow body 2 having a through opening 3 defining a respective forming zone, a first element 4 combined with the hollow body 2 for closing (thus if appropriate opening) the opening 3 at a first side of the forming zone, and a second element 5 combined with the hollow body 2 for closing (thus if appropriate opening) the opening 3 at a second side of the forming zone.

According to the example of FIGS. 1 and 2, the first element 4 and the second element 5 are removably combined with the hollow body 2, the possibility not being however excluded of providing a first and/or second elements constrained and movable with respect to the hollow body.

According to the invention, at least one among the afore said hollow body, the afore said first element and the afore said second element comprises a plurality of holes having a limited predefined width, which are open in the afore said at least one forming zone, thus facing the afore said opening, in particular such that the afore said forming zone is fluidically communicating with the environment outside of the mould, when the mould is assembled.

In particular, according to the example of FIGS. 1 and 2, the first element 4 and the second element 5 comprise respective pluralities of open holes in the forming zone, which are denoted with numeral 6.

In practice, according to the invention, the afore said forming zone is a portion of the mould 1 and in particular of the hollow body 2, which is intended to the forming of the afore said water-sensitive product in order to obtain the afore mentioned desired decorative object.

According to the invention and according to the example of FIGS. 1 and 2, the first element 4 and the second element 5 of the mould 1 can be considered a bottom and a lid respectively for the hollow body 2 and especially for the opening therein.

In this regard, according to the invention, it has to be added that once the mould is assembled, at least one between the afore said first element and the afore said second element preferably comprises at least one respective head portion to close the afore said opening, wherein the afore said at least one head portion remains at least partially inside the afore said at least one forming zone.

In accordance with the example of FIGS. 1 and 2, the first element 4 comprises a head portion 7 and the second element 5 comprises a head portion 8, which head portions 7, 8 juttingly extend from base portions 9, 10 of the first element 4 and the second element 5, respectively.

Still according to the examples of FIGS. 1 and 2, it has to be added that the hollow body 2 comprises a side wall 11 surrounding the opening 3 and having two opposing edges, both denoted with numeral 12.

According to the invention, the mould 1 comprises two opposing recesses both denoted with numeral 13 and also identified as first recesses, which in the example of FIGS. 1 and 2 are arranged on the same edge 12.

The recesses 13 thus have ends opening in opposing positions on the same edge 12, not being however excluded the possibility of providing two opposing recesses with respective ends opening in corresponding positions on each of the two opposing edges of the hollow body, i.e. one recess per edge, such an alternative not being illustrated in the figures.

Still according to the example of FIGS. 1 and 2, there is again to be said that the mould 1 comprises two opposing appendages 14 jutting from the hollow body 2 outside of the opening 3, each one provided with a respective recess 15 (second recess).

In particular, according to the invention, the recesses 15 of the appendages 14 each have a respective open end in a direction opposite to that of the open ends of the two opposing recesses 13 provided on the same edge 12 of the hollow body 2, in the specific case the first recesses upwards and the second recesses downwards.

Again, the mould 1 comprises tightening means denoted with numeral 16, to tighten one another the hollow body 2, the first element 4 and the second element 5, which according to the example of FIGS. 1 and 2 take the form of a plurality of clasps removably combined with the hollow body 2, the first element 4 and the second element 5.

Advantageously, the mould 1 also comprises housing seats 17 for the tightening means 16, thus for each clasp, the housing seats 17 taking the form of a plurality of grooves which are removably engaged by the afore said clasps and which are extended on the first element 4 and the second element 5.

Furthermore, still according to the example of the figures, the mould 1 comprises combining means of magnetic type to facilitate its assembling, and in particular comprises a plurality of magnets denoted with numeral 18 and arranged in corresponding positions in the hollow body 2, the first element 4 and the second element 5.

In detail, the magnets 18 are arranged on gripping members 19a, 19b and 19c provided in the hollow body 2, the first element 4 and the second element 5, respectively.

The magnets can possibly be replaced with snap-fit combining means, the so called "snap-fit" or other combining means of known type for a removable association.

Still according to the invention, it can be said that the forming zone of the present mould is flattened, and/or elongated, and/or linear, otherwise cylindrical as it will be more evident in the following.

According to the example of FIGS. 1 and 2, the forming zone of the mould 1 is an essentially flattened, elongated and linear zone, in particular for the formation of a bracelet.

In this regard, in order to facilitate the extraction of the bracelet from the hollow body, the present mould comprises extracting means adapted to cooperate with the forming zone.

Advantageously, the extracting means comprise an extracting element provided with a portion whose section essentially corresponds to the section of the opening of the hollow body, the extracting means can be isolated from the hollow body, the first element and the second element, or the extracting means can be constrained to the first element or the second element and possibly also made in one piece with, thus be integral to, the first element, the second element or the hollow body, as it will be more evident in the following.

According to the example of FIGS. 1 and 2, extracting means 20 are also shown having the shape of an extracting element of the afore said type, isolated from the hollow body 2, the first element 4 and the second element 5.

Figure 3:
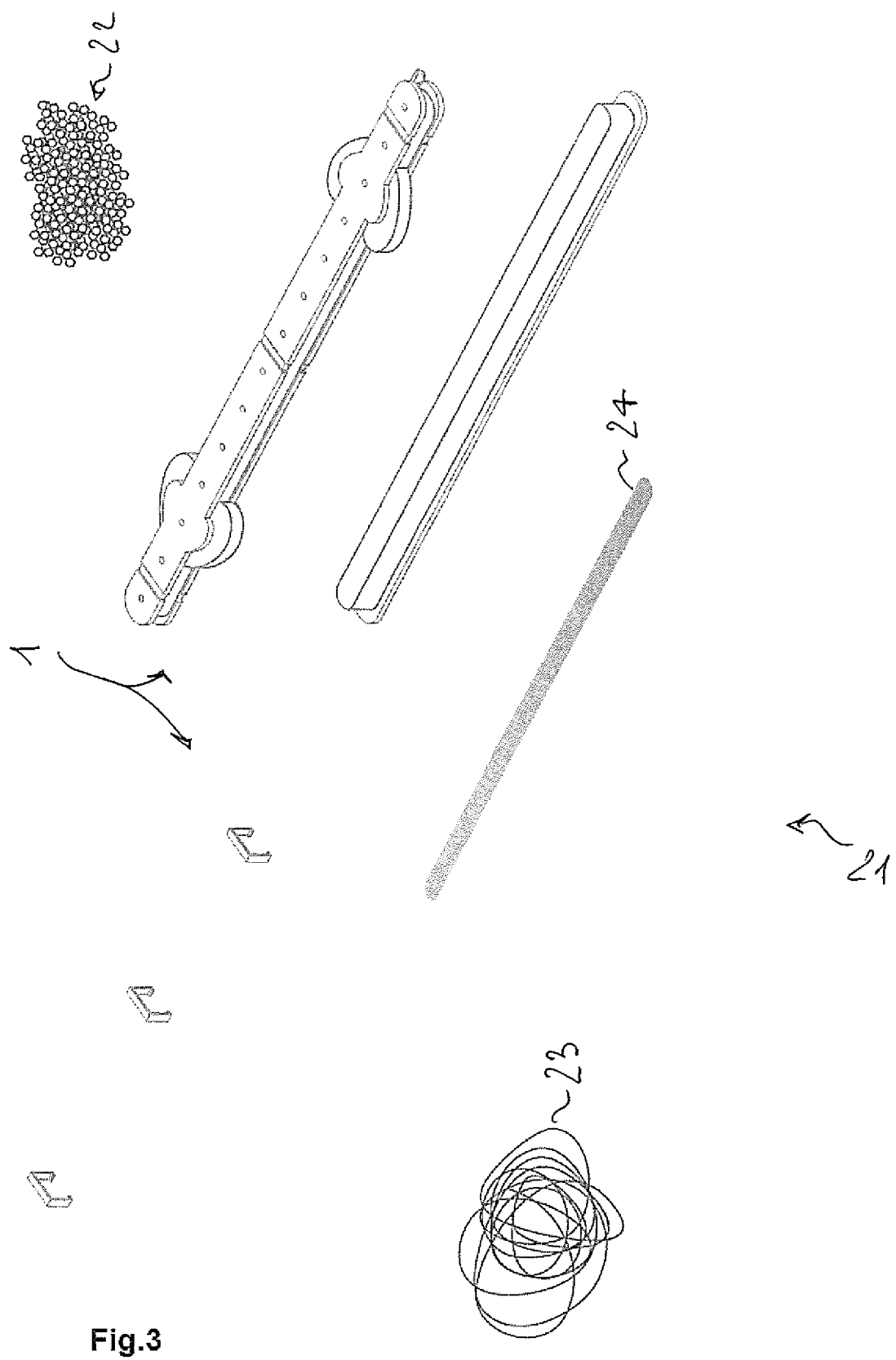
FIG. 3 shows a kit comprising: the mould of FIG. 1, a water sensitive granular product, a line-like string, and a strip of deformable rigid material, according to the present invention.

According to what above and referring to the example of FIG. 3, the present invention also provides a kit 21 for making jewelry as described above, comprising:
the mould 1;
a pack of a water-sensitive product 22, in powder or gel granule form;
a pack of strings, comprising at least one line 23, which is possibly ring-like closed;
a pack of strips of deformable rigid material comprising at least one strip 24 of such a material.

The line 23 can be made of any material suitable to make a clasp for example for bracelets, and preferably is made of a material selected from the group comprising: plastic, nylon, elastomer, string, silk, cotton.

In any case waterproof materials are preferred for the line 23 or however materials made waterproof, for example through treatments known in the art.

The strip 24 can be made of any material suitable to make a bottom of the decorative object, for example a bracelet, intended for contacting the skin, and preferably is of a material selected from the group comprising: fabric, decoupage paper, plastic.

In any case waterproof materials are preferred for the line 24 also or however materials made waterproof, for example through treatments known in the art.

According to the example of FIG. 3, the strip 24 has a profile essentially corresponding to the section of the opening 3 of the hollow body 2.

As mentioned above, the mould according to the present invention can be provided in alternative embodiments, some of which are described in the following, by way of example.

Figure 4:
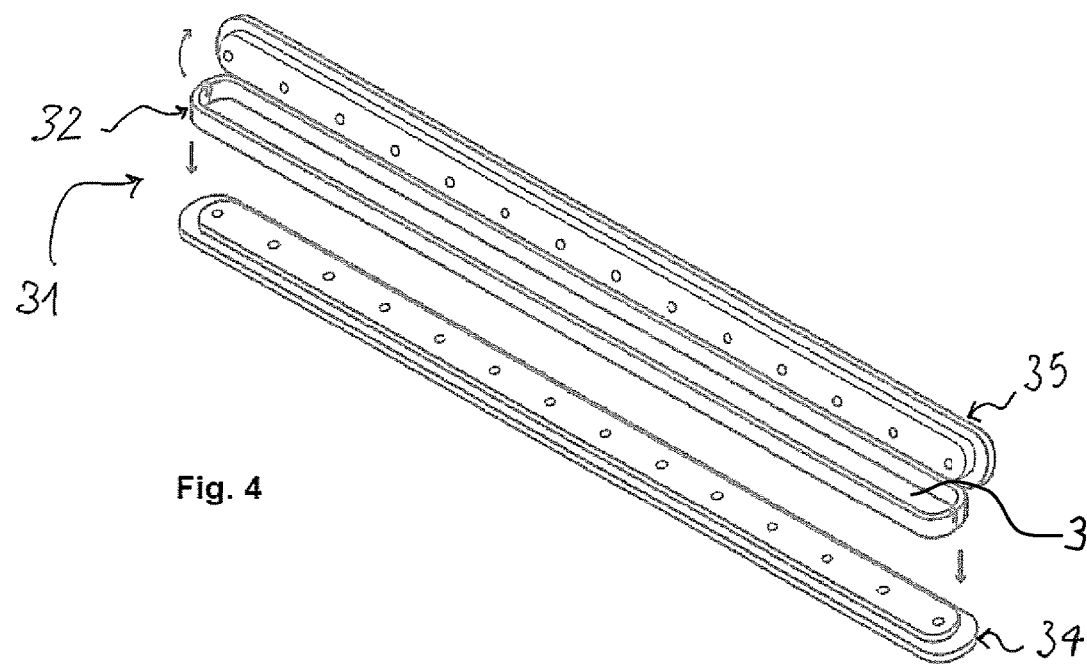
FIG. 4 shows the mould of FIG. 1 according to an alternative embodiment of the present invention.

In detail, the example of FIG. 4 illustrates a mould 31 wherein structural and functional parts corresponding to those of the afore described mould 1 keep the same reference numerals used in the example of FIGS. 1 and 2, to which description reference is made.

The mould 31 is in practice similar to the mould 1, but comprises a hollow body 32 constrained to one of the first element and the second element of the mould, so that to be movable with respect to the first or second element to which it is constrained.

In particular, in the example of FIG. 4 the mould 31 comprises, in addition to the hollow body 32, a first element 34, in practice a bottom, and a second element 35 to which the hollow body 32 is constrained and which serves in practice as a lid for opening-closing, at a side, the opening 3 of the same hollow body 32.

Figure 5:
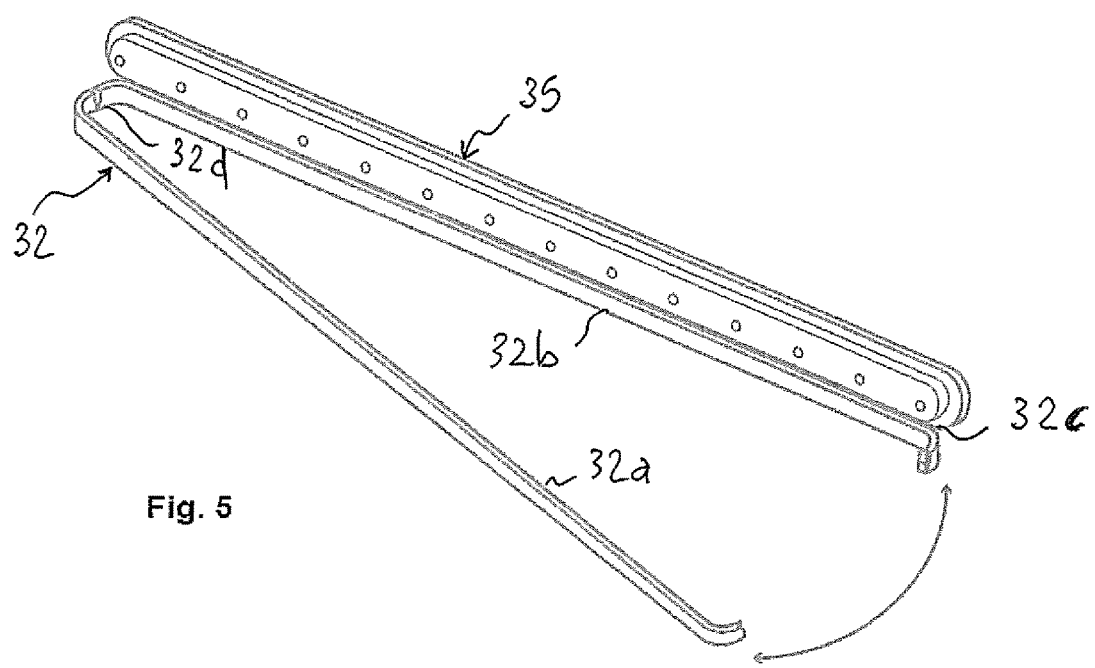
FIG. 5 shows a detail of the mould of FIG. 4.

Furthermore, as shown in the example of FIG. 5 illustrating a detail of the mould 31, the hollow body 32 is made of two portions, and namely comprises a first portion 32a and a second portion 32b which are paired to delimit the forming zone of the mould and which are also constrained one another so that to be movable one another.

In this regard the mould 31 comprises combining means adapted to allow the relative movement between the hollow body 32 and the second element 35, and also combining means adapted to allow the relative movement between the first portion 32a and the second portion 32b of the hollow body 32.

In detail the afore said combining means, in both cases, can be interlocked combining means, elastic combining means, snap-fit combining means, magnetic combining means, combining means consisting of weak portions, hinges, hooks.

In the example of FIGS. 4 and 5, both the afore said combining means are weak portions 32c, 32d made in one piece with the hollow body 32 and the second element 35 and respectively with the hollow body 32.

In this way the combining means 32d also serve as extracting means for the mould 31, which if appropriate advantageously allow the opening 3 of the same hollow body 32 to be widened, by moving the first portion 32a and the second portion 32b away from each other.

In other words, in this case, the extracting means are made in one piece with the hollow body of the mould.

Figure 6:
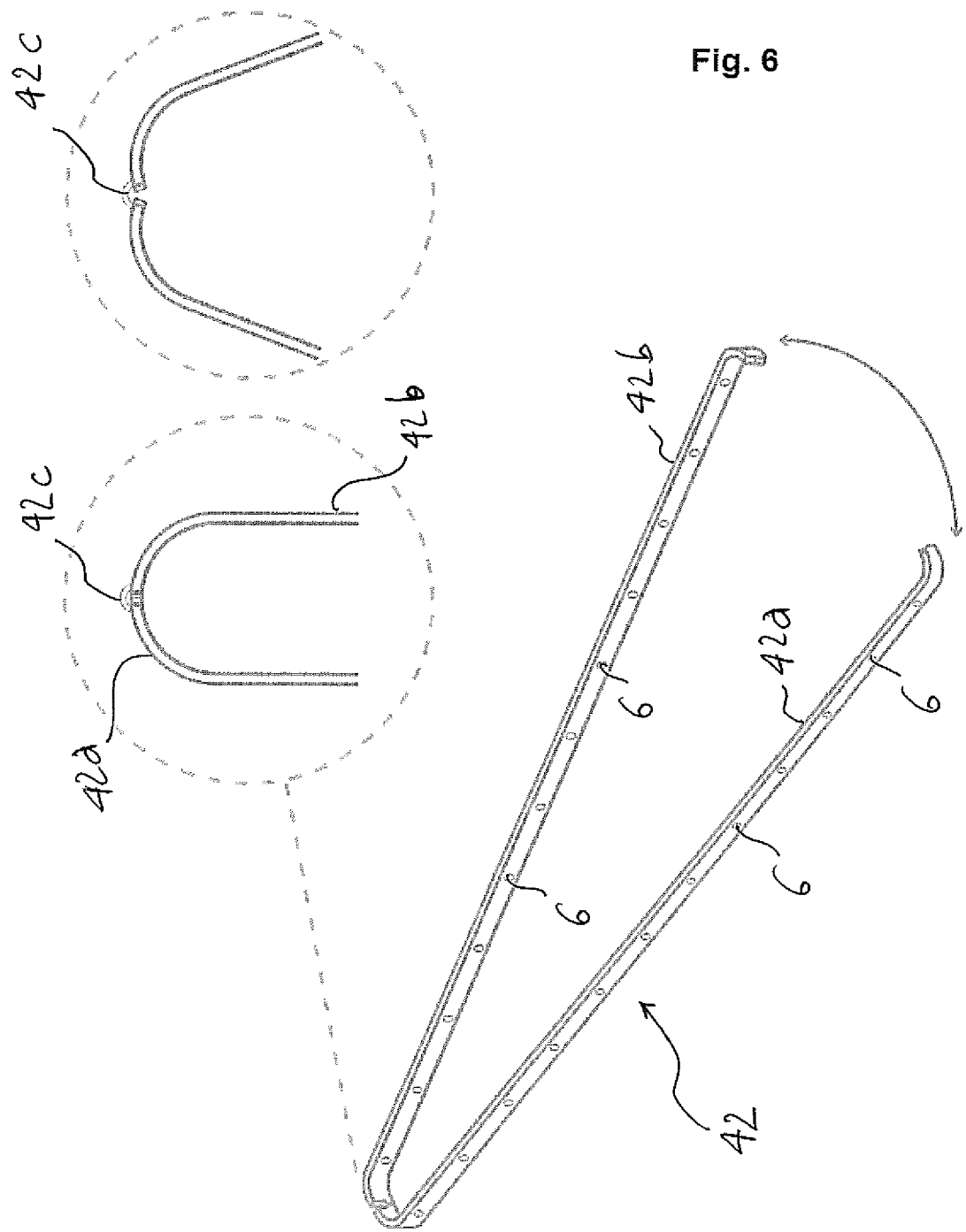
FIGS. 6-8 show a detail of the mould of FIG. 1 according to further embodiments of the present invention, wherein FIGS. 6 and 7 also show respective further enlarged details.
Figure 7:
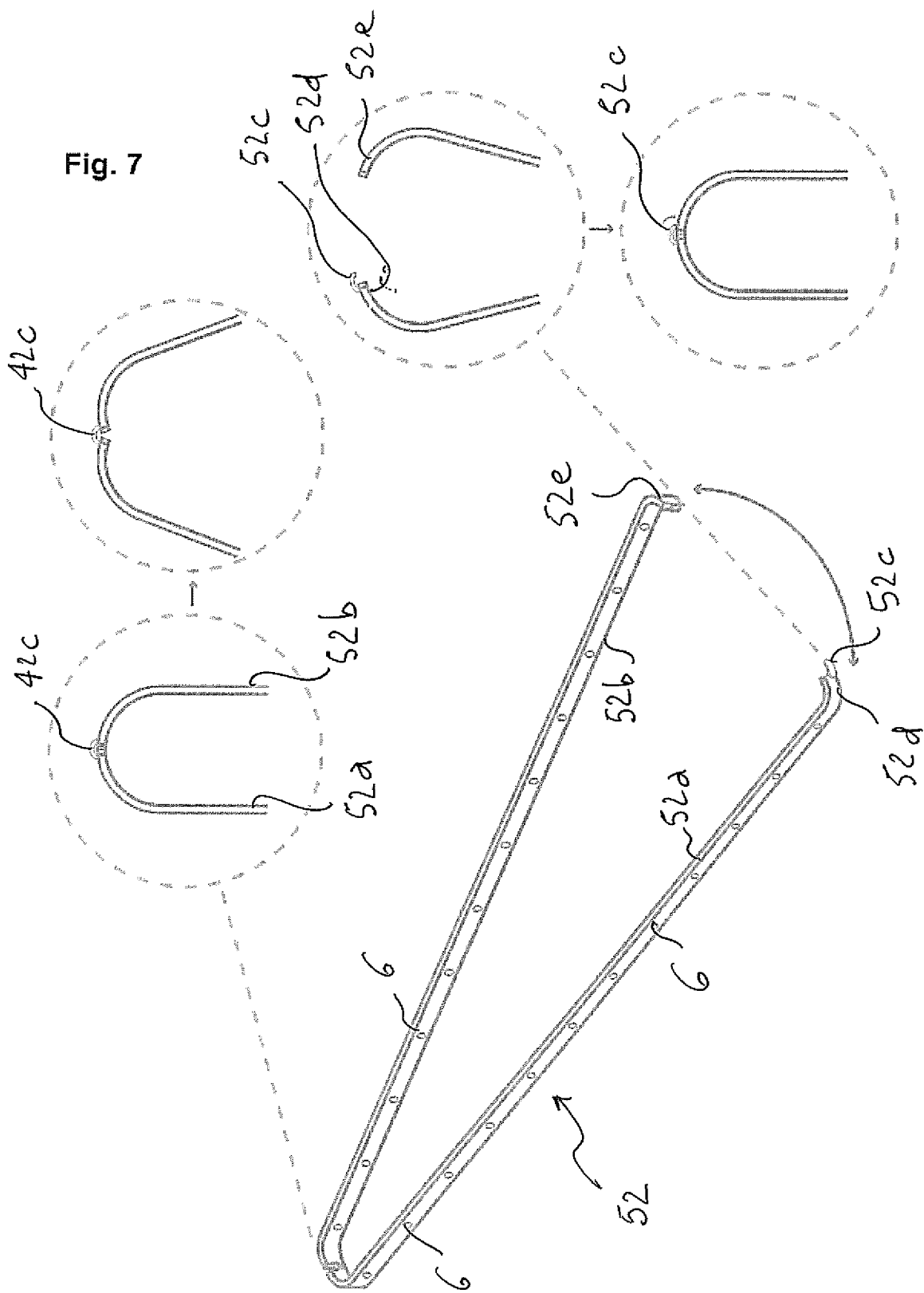
Figure 8:
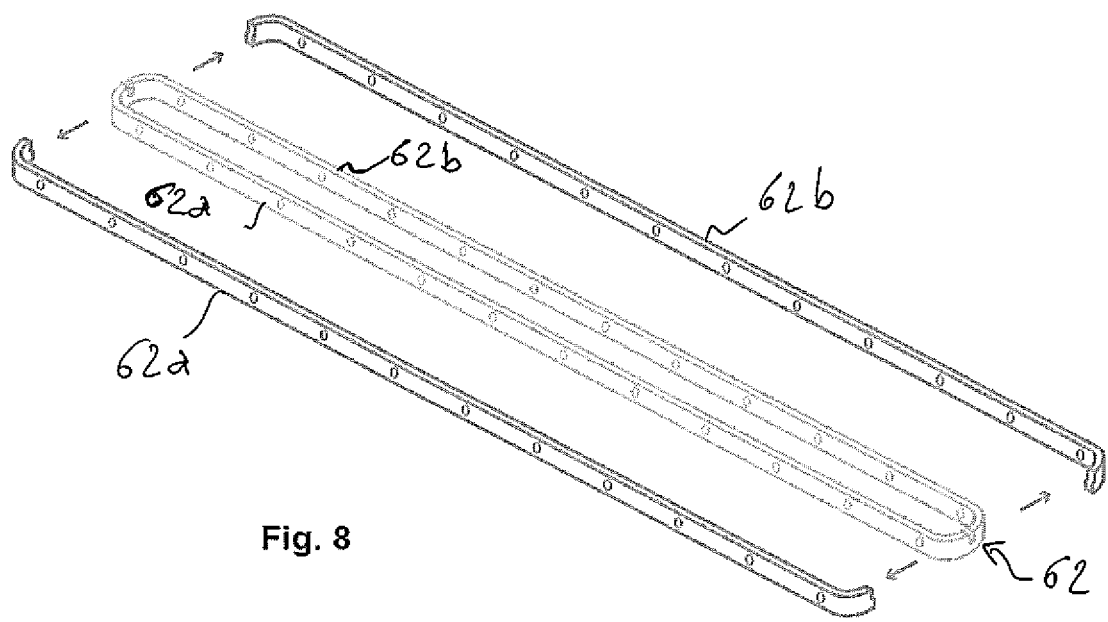

In this regard in the examples of FIGS. 6-8 further alternative embodiments of the mould according to the present invention are illustrated, and in particular alternative embodiments of the hollow body of the present mould are illustrated, wherein parts structurally and functionally corresponding to those of the moulds 1 and 31, and to which description reference has to be made, keep the same reference numerals previously used.

In detail, the example of FIG. 6 shows a hollow body 42 similar to the afore described hollow body 2 since intended for removable combining with both the first element and the second element of the mould that are adapted to close, at opposing sides, the opening of the hollow body, thus the forming zone of the mould.

The hollow body 42 is furthermore similar to the afore described hollow body 32, since comprising a first portion 42a and a second portion 42b which are paired to delimit the forming zone of the mould and constrained one another so that to be movable one another.

In order to allow the relative movement between the first portion 42a and the second portion 42b of the hollow body 42, combining means 42c are provided in this case, which have the shape of a hinge made in one piece with the hollow body, at which the first portion 42a and the second portion 42b are held together.

The example of FIG. 7 shows a hollow body 52 very similar to the afore described hollow body 42 to which description reference is made, thus comprising combining means 42c having the shape of a hinge, which allow the relative movement between a reciprocally constrained first portion 52a and second portion 52b of the hollow body 52, which in addition comprises further combining means 52c opposed to the afore said hinge, for catching-releasing respective free ends 52d, 52e of the first portion 52a and the second portion 52b, respectively.

Further combining means 52c in practice take the form of a hook combined at the free end 52d of the first portion 52a, and of a housing seat not illustrated in the example of FIG. 7, the latter being engaged-disengaged from the afore said hook and provided at the free end 52e of the second portion 52b of the hollow body 52.

FIG. 8 shows a hollow body 62 similar to those of the afore illustrated examples to which description reference is made, but in this case a first portion 62a and a second portion 62b are provided totally separable from one another, thus removably combined one another or however removably paired one another to delimit the forming zone of the mould, and for example combined with the first element and/or the second element of the mould, which close/open the forming zone of the mould itself.

Thus in this case combining means for removably coupling the first portion 62a with the second portion 62b are provided, or combining means for removably coupling the first portion 62a and the second portion 62b with the afore said first element and/or the afore said second element of the present mould.

Similarly to what above, also in this case the combining means, which are not-illustrated in the example of FIG. 8, can be interlocked combining means, elastic combining means, snap-fit combining means, magnetic combining means, hinges, hooks.

Figures 9A, 9B:
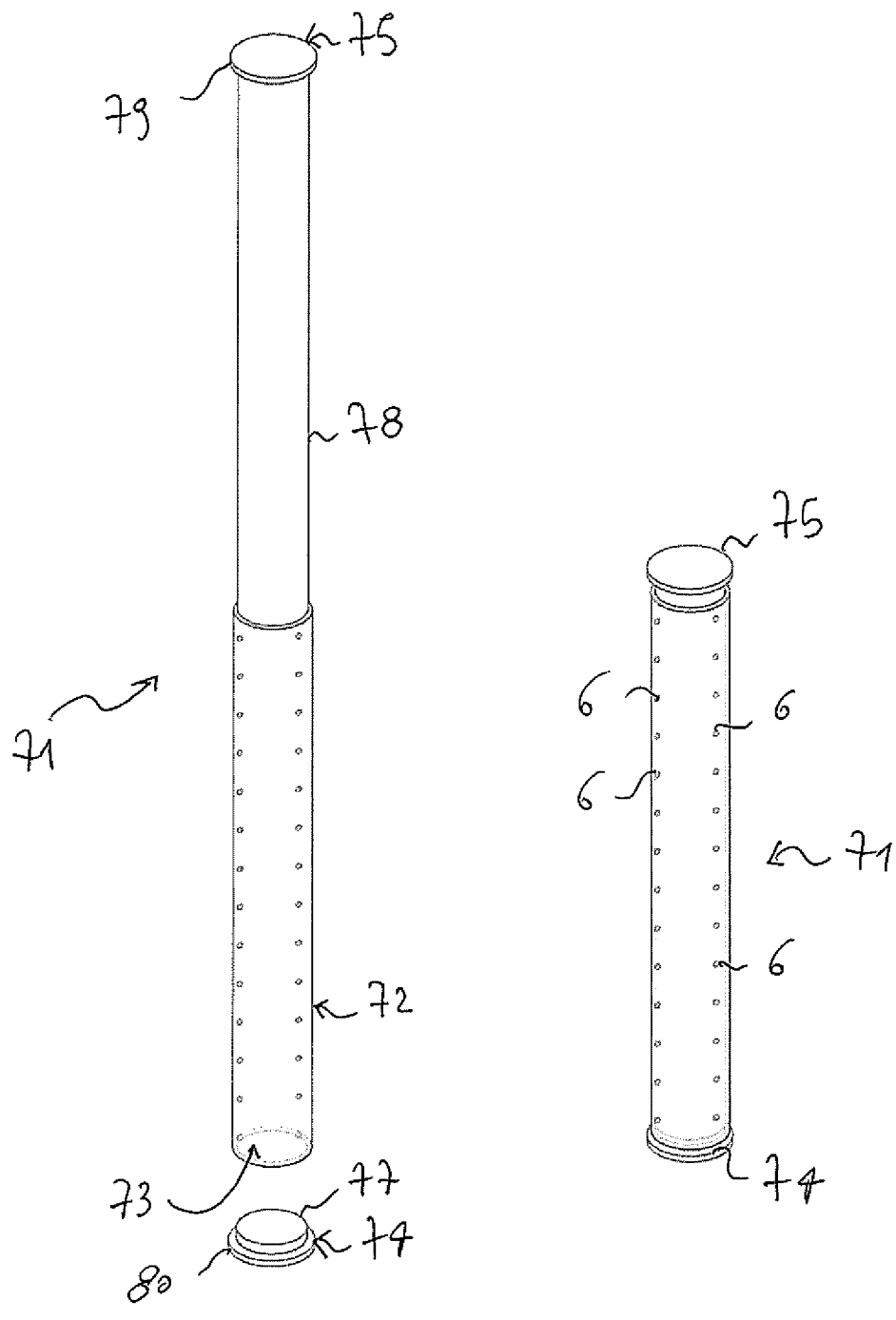
FIGS. 9a and 9b show the mould of FIG. 1 according to a further alternative embodiment of the present invention, respectively assembled and not-assembled.

FIGS. 9a and 9b show a further alternative embodiment of the mould according to the present invention, wherein parts structurally and functionally corresponding to those of the afore described mould 1, to which description reference is made, keep the same reference numerals used in the example of FIGS. 1 and 2.

In detail, FIGS. 9a and 9b show a mould 71 similar to the afore illustrated mould 1, comprising a hollow body 72 having an opening 73 defining a respective forming zone, a first element 74 combined with the hollow body 72 to close (thus if appropriate open) the opening 73 at a first side of the forming zone, and a second element 75 combined with the hollow body 72 to close, and possibly open, the opening 73 at a second side of the forming zone.

In other words the opening 73 can be through or blind, depending upon whether the combining of the second element 75 with the hollow body 72 is removable or else not removable.

According to the example of FIGS. 9a and 9b, the first element 74 is removably combined with the hollow body 72, whereas the second element 75 can be removably combined with the hollow body 72 or else it can be constrained to the hollow body 72, in either case the second element 75 is however movable with respect to the hollow body 72 and in particular it is sliding therein.

In the example of FIGS. 9a and 9b, in fact, the hollow body 72, which is provided with holes 6, and the respective opening 73 define a cylindrical forming zone.

In this regard, the first element 74 comprises a head portion 77 having predefined limited extent, whereas the second element 75 comprises a head portion 78 having larger extent, and nominally having extent essentially corresponding to the extent of the cylindrical forming zone of the mould 71.

The head portions 77 and 78 juttingly extend from base portions 80, 79 of the first element 74 and the second element 75, respectively.

In practice the head portion 78 embodies extracting means and namely serves as an extracting element as previously mentioned, which extracting means are made in one piece with the second element 75 of the mould 71.

Figure 10:
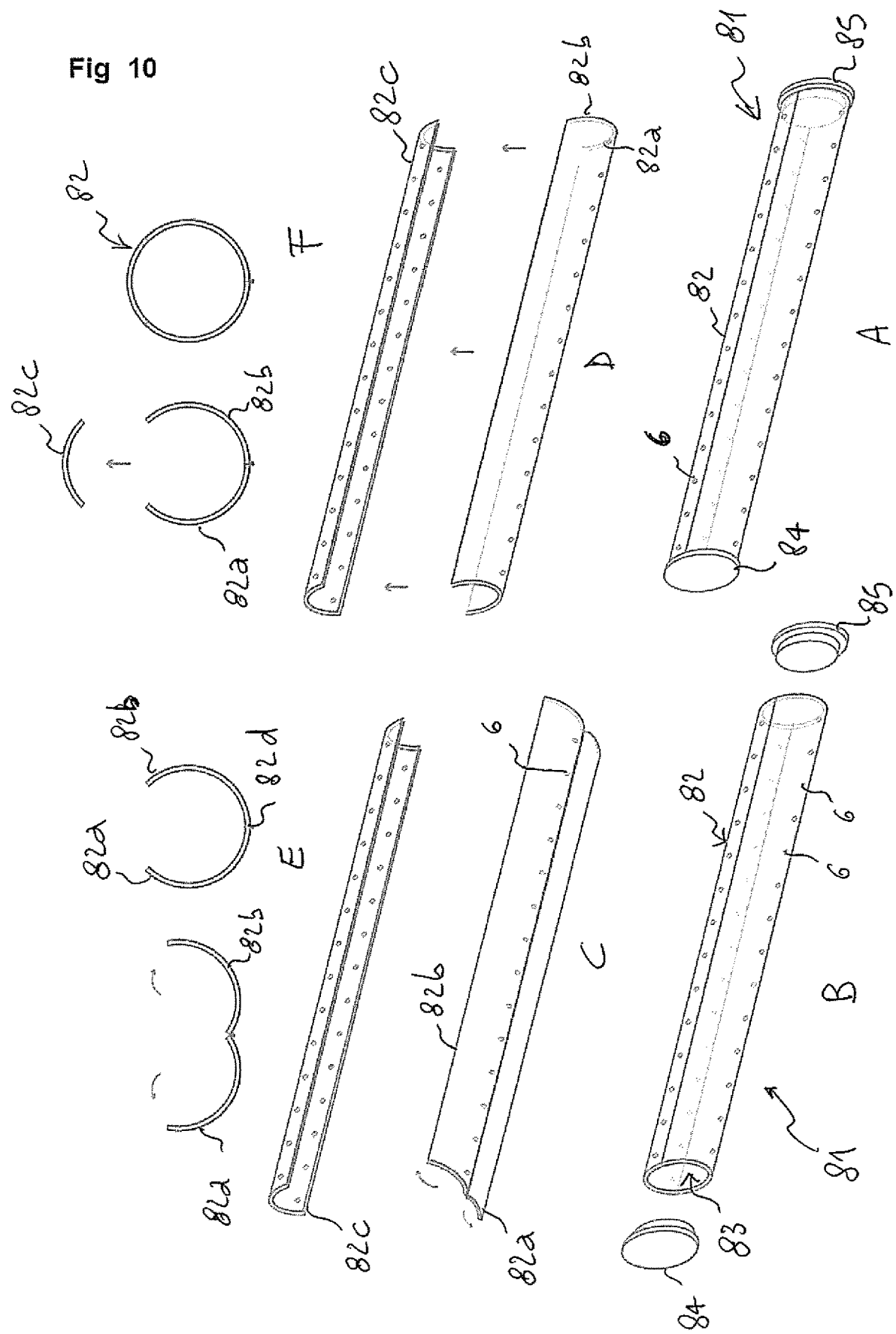
FIG. 10, in its portions A and B, shows the mould of FIG. 1 according to a further alternative embodiment of the present invention, respectively assembled and partially assembled; whereas in the portions C, D, E and F details are shown, with separate parts also, of the afore said mould, according to perspective and front views.

The example of FIG. 10 shows a further alternative embodiment of the mould according to the present invention, wherein parts structurally and functionally corresponding to those of the afore described moulds, to which description reference is made, keep the same reference numerals previously used.

In particular FIG. 10, in its portions A and B, shows a mould 81 assembled and respectively partially assembled, whereas the portions C, D, E and F of the example of FIG. 10 show details of the mould 81, according to perspective and front views.

In this case the mould 81 comprises a hollow body 82 having a through opening 83 defining a respective forming zone, a first element 84 combined with the hollow body 82 to close, thus open, the opening 83 at a first side of the forming zone, and a second element 85 combined with the hollow body 82 to close, thus open, the opening 83 at a second side of the forming zone.

According to the example of FIG. 10, both the first element 84 and the second element 85 are removably combined with the hollow body 82 which is provided with holes 6 and defines, with the respective opening 83, a cylindrical forming zone.

In detail the hollow body 82 comprises a first portion 82a, a second portion 82b and a third portion 82c, wherein the first portion 82a and the second portion 82b are constrained one another so that to be movable one another, whereas the third portion 82c is interposed between, and removably combined with, the first and second portions 82a and 82b.

For this purpose the mould 81 comprises combining means that can be made integral to the hollow body 82, such as for example weak portions of the afore said first portion or second portion, or a hinge made in one piece with the hollow body, as well as other combining means can be provided adapted to constrain the afore said first portion to the afore said second portion so that, as afore mentioned, they can move one another, in particular for moving away from one another with respect to the assembled and closed mould position.

According to the example of FIG. 10, combining means 82d are provided that take the form of a hinge combined with the first portion 82a and the second portion 82b of the hollow body 82.

On the contrary, the third portion 82c removably combines with the first portion 82a and the second portion 82b, advantageously by interlocking, however not being excluded the possibility of providing proper combining means of the previously mentioned type.

The example of FIG. 11 illustrates a mould 91 wherein parts structurally and functionally corresponding to those of the afore described mould 1 keep the same reference numerals used in the example of FIGS. 1 and 2, to which description reference is made.

The mould 91 is in practice similar to the mould 1, but comprises different tightening means.

In detail, the mould 91 comprises tightening means comprising a plurality of jutting elements 96 made in one piece with the first element of the mould, in the specific case a first element denoted with numeral 94, and a respective plurality of perforated elements 97 made in one piece with the second element of the mould, in the specific case a second element denoted with numeral 95.

Each of the perforated elements 97 is movable between at least one catch position, wherein each respective hole 98 is engaged by a respective jutting element 96, and at least one release position in which the holes 98 of the perforated elements 97 are disengaged from the jutting elements 96.

In the example of FIG. 11 the mould 91 comprises a hollow body denoted with numeral 2 and holes 6 arranged on the first element 94.

Briefly, as far as already evident in the afore mentioned description, the use of the present mould, in particular referring to the mould 1 and the kit 21 of the examples of FIGS. 1, 2 and 3, can be so summarized.

First of all, the first element is combined with the hollow body, then the line is positioned inside the hollow body, thus making it pass in the recesses provided on the side wall of the hollow body and then tightening the line in the recesses provided on the appendages of the hollow body.

Then the water sensitive product is inserted in the opening of the hollow body, i.e. in the forming zone, up to the edge of the side wall of the hollow body. Then the strip of deformable rigid material is positioned over the water sensitive product contained in the hollow body. Then the second element of the mould (lid) is positioned to close the opening of the hollow body. Then the assembled mould containing the water sensitive product is immersed in water, for a time depending upon the characteristics of the water sensitive product, for example one minute. Thus the mould is drawn from the water and let dry for about three minutes. The first element and the second element are removed from the hollow body, the line is released from the recesses and the obtained bracelet is drawn, possibly by the aid of the extracting means.

Note that alternatively to what above, the strip of deformable rigid material can be arranged over the water sensitive product after the mould has been immersed in, thus drawn from, water, subject to waiting for a determined time for an at least partial drying of the solid, compact and rubbery material obtained from the water sensitive product.

The advantages of the present invention, already evident in the afore reported description, can be summarized by underlining that a mould for kids is provided to be used with a water sensitive product in powder or granular form, being structurally and functionally simple, thus cheap to implement, not requiring particular manual skills to be used and, therefore, being suitable to be easily employed by a kid, and also being particularly effective and high performing in the making of wristbands, bracelets, necklaces, small necklaces, clips, pins, rings and like decorative objects or jewelry.

To the present invention, in the illustrated and described embodiments, in order to satisfy contingent and specific requirements, a person skilled of the art can make a number of variations and changes, on the other hand all contained in the scope of protection of the invention as defined by the following claims.

The invention claimed is:

1. A mold (1, 31, 81, 91) comprising: —a hollow body (2) having at least one opening (3) defining at least one respective forming zone; —a first element (4) combined with said hollow body (2) for closing-opening said at least one opening (3) at a first side of said at least one forming zone; —a second element (5) combined with said hollow body (2) for closing, and opening, said at least one opening (3), at a second side of said at least one forming zone; wherein at least one of: said hollow body (2), said first element (4) or said second element (5), comprises a plurality of holes (6) which are open in said at least one forming zone, such that said at least one forming zone is fluidically communicating with the environment outside of said mold (1), and wherein said hollow body (2) comprises a side wall (11) surrounding said at least one opening (3) and having two opposing edges (12), said mold (1) comprising at least two opposing recesses (13), wherein said two opposing recesses (13) have respective ends opening in opposing positions on a same edge between said two opposing edges (12), or wherein said two opposing recesses have respective ends opening in corresponding positions on each of said two opposing edges, one recess per edge.

2. The mold (1) according to claim 1, wherein at least one of: said first element (4) or said second element (5) comprises at least one respective head portion (7, 8) to close said at least one opening (3), said at least one head portion (7, 8) remaining at least partially inside said at least one forming zone.

3. The mold (1, 31, 81) according to claim 1, comprising an extractor (20) adapted to cooperate with said at least one forming zone, wherein said extractor (20) comprises at least one extracting element having at least one portion whose shape essentially corresponds to a shape of said at least one opening (3), wherein said at least one extracting element is constrained to said first element or said second element, wherein said extractor is made in one piece with said first element, said second element or said hollow body.

4. The mold (31) according to claim 1, wherein said hollow body (32) is constrained to at least one of: said first element (34) or said second element (35) so that to be movable with respect to at least one of: said first element (34) or said second element (35), wherein said hollow body (32) comprises at least one first portion (32a) and one second portion (32b) which are paired to delimit said at least one forming zone and constrained to one another so as to be movable one to another, said mold (31) comprising combining means (32c, 32d) adapted to allow the relative movement between said hollow body (32) and at least one of: said first element (34) or said second element (35), and between said first portion (32a) and said second portion (32b), wherein said combining means are preferably selected from the group of: interlocked combining means, elastic combining means, snap-fit combining means, magnetic combining means, combining means consisting of weak portions, hinges, and hooks.

5. The mold according to claim 1, wherein said hollow body comprises at least one first portion and one second portion which are paired to delimit said at least one forming zone, wherein said at least one first portion and one second portion are removably combined one another, or wherein said at least one first portion and one second portion are constrained to one another so that to be movable one to another.

6. The mold according to claim 1, wherein said hollow body comprises at least one first portion and one second portion which are preferably removably combined with at least one of: said first element or said second element, wherein said at least one first portion and one second portion abut one another to delimit said at least one forming zone.

7. The mold according to claim 5, comprising at least one of: combining means to removably couple said first portion with said second portion, or combining means for the possibly removable coupling of said first portion and said second portion with at least one of: said first element or said second element, wherein said combining means are selected from the group consisting of: interlocked combining means, elastic combining means, snap-fit combining means, magnetic combining means, combining means consisting of weak portions, hinges, and hooks.

8. The mold according to claim 1, further comprising two opposing appendages (14) jutting from said hollow body (2) outside of said at least one opening (3), wherein each of said two opposing appendages (14) is provided with a respective recess (15).

9. The mold according to claim 8, wherein each recess (15) of said appendages (14) has a respective open end in a direction opposite to that of said ends opening of said two opposing recesses.

10. The mold according to claim 1, further comprising tightening means (16) to tighten one another said hollow body (2), said first element (4) and said second element (5), wherein said tightening means (16) comprise at least one clasp removably combined with said hollow body (2), said first element (4) and said second element (5), and wherein at least one of said hollow body (2), said first element (4) or said second element (5), comprises at least one housing seat (17) engaged by said tightening means (16).

11. The mold according to claim 1, comprising tightening means to tighten one another said hollow body (2), said first element (94) and said second element (95), wherein said tightening means comprise a plurality of jutting elements (96) made in one piece with said first element (94), and a respective plurality of perforated elements (97) made in one piece with said second element (95), wherein each of said perforated elements (97) is movable between at least one catch position in which a respective hole (98) thereof is engaged by a respective jutting element (96), and at least one release position in which the holes (98) of said perforated elements (97) are disengaged from said jutting elements (96).

12. The mold according to claim 1, wherein said at least one forming zone is essentially at least one of: flattened, elongated, linear, or otherwise cylindrical.

13. The mold (81) according to claim 5, wherein said hollow body (82) comprises a third portion (82c) interposed between said first portion (82a) and said second portion (82b) to delimit said at least one forming zone, wherein said third portion (82c) is removably combined with at least one of: said first portion or said second portion.

14. A kit (21) comprising at least one mold (1) according to claim 1 and at least one of:
 a pack of a water-sensitive product (22), in powder or gel granule form;
 a pack of strings, comprising at least one line (23) which is ring-like closed; or
 a pack of strips of deformable material comprising at least one strip (24) of said material.

* * * * *